United States Patent
Parasram et al.

(10) Patent No.: US 11,454,110 B2
(45) Date of Patent: Sep. 27, 2022

(54) DIRECT SEQUENCE SPECTRUM SIGNAL DOWNHOLE TOOL

(71) Applicants: Ryan Parasram, Houston, TX (US); Adam Gresswell, Katy, TX (US); Rich Warner, Arlington, TX (US); David Wadsworth, Katy, TX (US); Nigel Prior, Bellaire, TX (US)

(72) Inventors: Ryan Parasram, Houston, TX (US); Adam Gresswell, Katy, TX (US); Rich Warner, Arlington, TX (US); David Wadsworth, Katy, TX (US); Nigel Prior, Bellaire, TX (US)

( * ) Notice: Subject to any disclaimer, the term of this patent is extended or adjusted under 35 U.S.C. 154(b) by 0 days.

(21) Appl. No.: 17/192,040

(22) Filed: Mar. 4, 2021

(65) Prior Publication Data

US 2021/0277774 A1 Sep. 9, 2021

Related U.S. Application Data

(62) Division of application No. 16/499,226, filed on Sep. 27, 2019, now Pat. No. 10,982,533.

(51) Int. Cl.
*E21B 47/12* (2012.01)
*H04B 1/38* (2015.01)
*H04B 1/707* (2011.01)
*H04L 9/40* (2022.01)

(52) U.S. Cl.
CPC ............... *E21B 47/12* (2013.01); *H04B 1/38* (2013.01); *H04B 1/707* (2013.01); *H04L 63/0428* (2013.01)

(58) Field of Classification Search
CPC ........... E21B 47/12; H04B 1/38; H04B 1/707; H04L 63/0428; H04L 63/062
See application file for complete search history.

(56) References Cited

U.S. PATENT DOCUMENTS 7,147,059 B2 * 12/2006 Hirsch .................. E21B 17/003
166/372
2017/0226848 A1 * 8/2017 Chatelet ............... G01V 11/002

* cited by examiner

*Primary Examiner* — Kabir A Timory
(74) *Attorney, Agent, or Firm* — Kearney, McWilliams & Davis, PLLC; William Yarbrough

(57) ABSTRACT

Embodiments described herein comprise a wellbore system having a controller, one or more downhole tools, and a conveyance configured to lower the one or more downhole tools into the wellbore. The one or more control nodes are located in at least one of the downhole tools and wherein the control nodes activate a portion of the downhole tool and data is exchanged between the control node and the controller using a direct sequence spread spectrum signal.

17 Claims, 12 Drawing Sheets

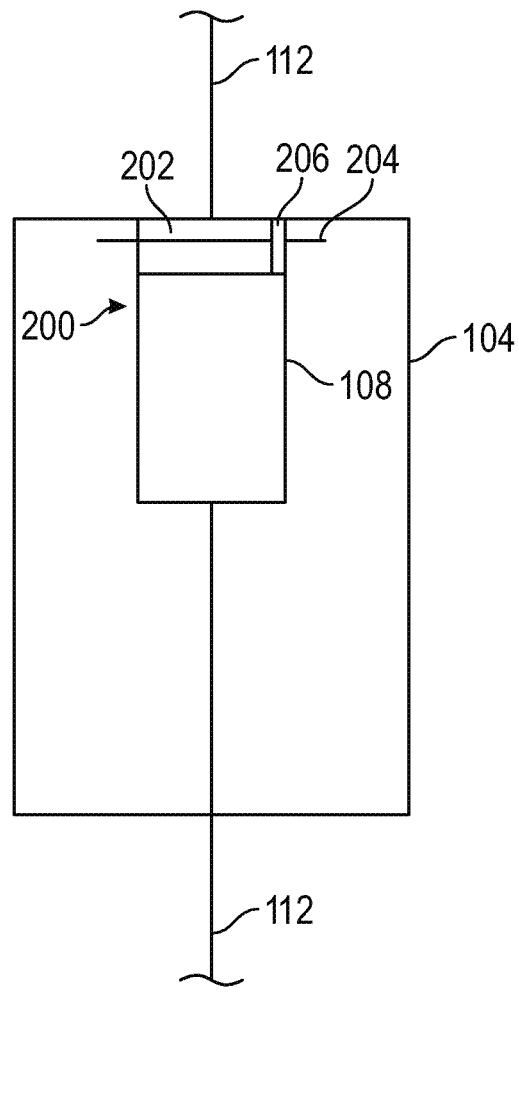
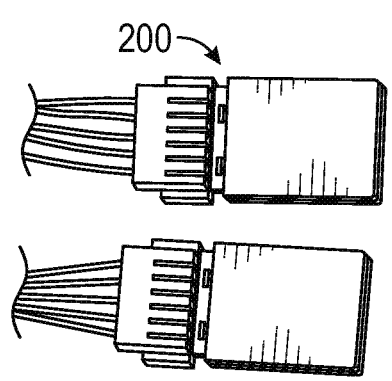
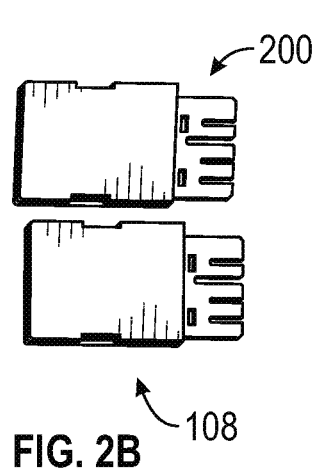
FIG. 2A    FIG. 2B

DIRECT SEQUENCE SPECTRUM SIGNAL DOWNHOLE TOOL

CROSS-REFERENCE TO RELATED APPLICATIONS

U.S. Provisional Patent Application No. 62/477,293 filed Mar. 27, 2017 U.S. Provisional Patent Application No. 62/528,034 filed Jun. 30, 2017 PCT International Patent Application No. PCT/US18/24574 filed Mar. 27, 2018 U.S. National Stage patent application Ser. No. 16/499,226 filed Sep. 27, 2019

FEDERALLY SPONSORED RESEARCH OR DEVELOPMENT

Not Applicable

INCORPORATION BY REFERENCE OF MATERIAL SUBMITTED ON A COMPACT DISK

Not Applicable

BACKGROUND

Embodiments of the inventive subject matter generally relate to the field of communication with downhole tools.

The invention relates to techniques for performing oilfield operations relating to subterranean formations having reservoirs therein. More particularly, the invention relates to techniques communicating with downhole tools in a wellbore using direct sequence spread spectrum encoding.

Oilfield operations are typically performed to locate and gather valuable downhole fluids from a reservoir. Typical oilfield operations may involve, for example, surveying, seismic testing, drilling, wireline testing, completions, production, planning, and oilfield analysis. Drilling operations may involve drilling a wellbore, pumping a mud into the wellbore, and the like. Due to the harsh environment in a wellbore, communicating with a downhole tool may be done via mechanical or fluid means.

Despite the existence of techniques for communicating with downhole tools, there remains a need to reliably communicate and activate downhole tools by transferring information reliably with minimal resources using a line that provides power to the downhole tools.

SUMMARY

Embodiments of the invention include a wellbore system having a controller, one or more downhole tools, a conveyance for lowering the one or more downhole tools into the wellbore and one or more control nodes located in at least one of the of the downhole tools wherein the control nodes activate a portion of the downhole tool and data is exchanged between the control node and the controller using a direct sequence spread spectrum signal. The conveyance may be a long haul wireline cable and the wireline cable may be a Monocable, heptacable or wire in coiled tubing. The control node may function in a high shock environment, where explosives are used. The control node may interface to one or more actuators. The control node may interfaces with one or more sensors. The control node may be configured to log data to non-volatile memory for subsequent analysis. The control node may be configured for power below 100 mW while receiving and transmitting. The control node may be configured to operate in temperatures between −40 Fahrenheit and 392 Fahrenheit.

The wellbore system may utilize a direct sequence spread spectrum transceiver physical layer is implementable of a low end 16 bit or 32 bit fixed point microcontroller executing at 4 Mhz or more. The wellbore system may log data wherein the logged data may include one or more of the following items, the number of commands of each type sent, the time at temperature, and the number of sensed events, a sensed event may be a physical shock, and/or a sensed event may be a voltage event.

The control node may be configured to initialize itself on power up by checking nonvolatile memory.

The one or more of the control nodes may be configured to be a plurality of downhole tools.

The one or more downhole tools has a plurality of downhole tools in it and one of the multiple downhole tools may be a perforating gun, a tension tool, a release tool, a casing collar locator, a pressure monitor At least one of the one or more downhole tools has a plurality of downhole tools in it and one of the multiple downhole tools is configured to digitize any or all of its sensors and/or controls any or all of its actuators.

The control node protects its actuator from RF induced power, where RF protection includes redundant devices to provide high resistance to induced current The control node protects its detonator from applied power using a current shunt where the shunt may be passive, e.g., a positive temperature coefficient thermistor and/or active, e.g., a relay or a solid state switch. The shunt may also be protected from failing short with an inline fuse The control node is able to detect actuation by sensing the effect of actuation. Actuation may result in gun firing, plug setting or may be a low order detonation. Either or all states may be detectable. The detection sensor may be piezoelectric, microelectromechanical sensor (MEMS), a vibrating contact based sensor, e.g. a (reed) relay or a micro vibration sensor based on a mobile micro sphere whose motion bridges between 2 contacts.

Each of the control nodes may have an inline bus switch. The inline bus switch may be normally open, configured to activate the control node in the next lower downhole tool, or normally closed, configured to deactivate the control node in the next lower downhole tool.

The controller may be configured to count the number of control nodes on the conveyance. This may be accomplished by manipulating the switches and/or monitoring device power draw (head voltage or current consumption).

The controller may be configured to communicate with one or more control nodes without addresses. Communication may be broadcast or targeted using encrypted payloads that only the targeted node or nodes may decipher with their encryption key.

The controller may be configured to determine the order of the control nodes on the conveyance. The order may be memorized by caching the encryption keys for each node.

The control nodes' electronics may have connectors. The connectors may be mechanically keyed, for unambiguous installation, and/or retained, for shock and vibration. The connector may be a card edge connector.

The encryption key may be preprogrammed in the control node or generated in the microcontroller by a peripheral and/or derived from a built-in identifier. The peripheral may be a random number generator, an encryption engine, a CRC engine or a silicon identifier from part manufacture Embodiments of the invention include a method for actuating a downhole tool, comprising: encrypting a command, sending the encrypted command from a controller to a control node in the downhole tool using a direct sequence spread spectrum signal, receiving the encrypted command at the control node in a wellbore, determining the encrypted command is valid, and actuating the downhole tool.

Actuating the downhole tool may include using one or more steps each comprising sending another encrypted command mem from the controller to the control node. Encryption keys for each step may be the same or different.

Actuating the downhole tool may further comprise applying a voltage signature to the control node. The signature may have one or more thresholds.

Embodiments of the invention may include further actuating another control node in another downhole tool by commanding one or more successive inline bus switches in the control nodes.

Embodiments of the invention may further include actuating another control node in another downhole tool by having the controller cycle power applied to the control node, and navigating to the desired control node using commands to the inline bus switches.

BRIEF DESCRIPTION OF THE DRAWINGS

The present embodiments may be better understood, and numerous objects, features, and advantages made apparent to those skilled in the art by referencing the accompanying drawings.

FIG. 2A depicts a diagram illustrating a schematic view of a connector for connecting a control node or downhole tool to a conveyance.

FIG. 2B depicts a diagram illustrating a schematic view of the connector wherein the connector is a card edge connector.

DESCRIPTION OF EMBODIMENT(S)

The description that follows includes exemplary apparatus, methods, techniques, and instruction sequences that embody techniques of the present inventive subject matter. However, it is understood that the described embodiments may be practiced without these specific details.

Figure 1:
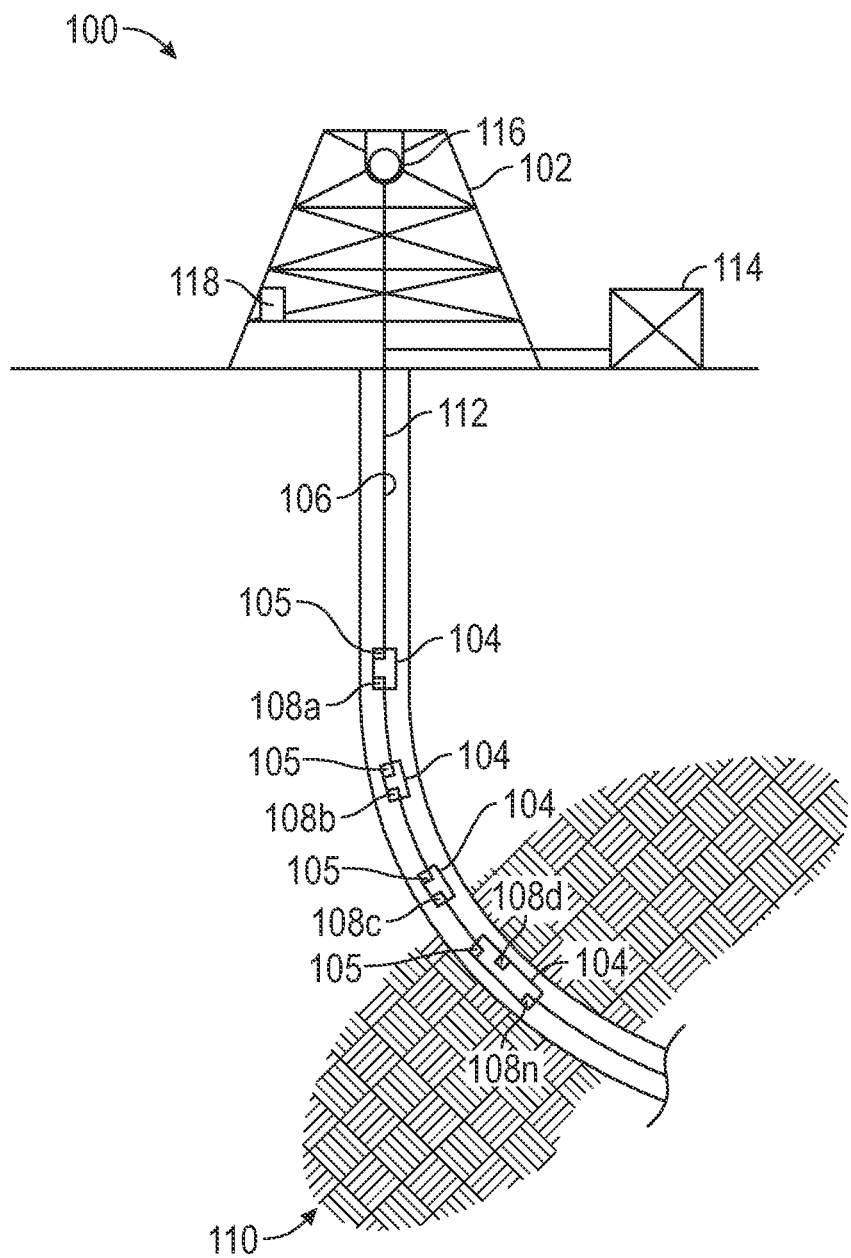
FIG. 1 depicts a diagram illustrating a schematic view of a wellsite having one or more downhole tools with a control node.

FIG. 1 depicts a schematic view of a wellsite 100 having an oilrig 102 with one or more downhole tools 104 suspended into a wellbore 106. The downhole tool(s) 104 has one or more control nodes 108a-n, or downhole nodes, for controlling at least one function of the downhole tools 104. The one or more control nodes 108 may use direct sequence spread spectrum (DSSS) encoding for an increased signal to noise ratio (SNR) as will be discussed in more detail below. As shown, the wellsite 100 is a land based wellsite 100, but could also be water based. The wellsite 100 may have a reservoir 110, which may contain valuable fluids (such as hydrocarbons) to be produced. The wellsite 100 may have wellsite equipment such as a conveyance 112, a controller 114, or surface master controller (SMC), a hoist 116, and a wellsite communication device 118. The controller 114 may be in communication with the one or more control nodes 108a-n via the conveyance 112. The controller 114 may send data and/or power to and from the one or more control nodes 108a-n in order to control one or more functions on the downhole 00 104, as will be discussed in more detail below.

The one or more downhole tools 104 may be any suitable downhole tool capable of being activated or actuated by the one or more control nodes 108. In an embodiment, the one or more downhole tools 104 are perforation guns configured to pierce the wall of the wellbore 106. In another embodiment, the downhole tool 104 may be a release tool configured to release the lower section of the tool string from the conveyance 112. Although the downhole tool 104 is described as being a perforation gun or a release tool, it should be appreciated that the downhole tool 104 may be any suitable tool for performing downhole functions including, but not limited to, an actuator trigger, a perforation detonator controller, a tool release actuator controller, a solenoid actuator trigger, a packer, a logging tool, a pump, a latch and the like. In addition, the downhole tool 104 and control node 108 may be used in any situation where a very reliable link is needed in low signal-to-noise ratio (SNR) conditions. This is very difficult to implement with limited resources on the downhole receiver due to the complex calculations required. An additional application is to use it in any existing downhole tool that has an existing communication system, where it may added as a very reliable link for node configuration.

The conveyance 112 is a wireline cable in one embodiment. Although shown as a wireline cable, it should be appreciated that the conveyance 112 may be any suitable system for delivering the downhole tools 104 into the wellbore 106 including, but not limited to, an oilfield mono-conductor cable, a long haul cable, a slick line, a coiled tubing, a drill string, a casing string, and the like. The mono-conductor cable may be any suitable electro-mechanical cable suitable for transmitting data between the controller 114 and the control nodes 108 on the downhole tools 104. In an embodiment, the conveyance 112 has at least two wires. In an embodiment, the conveyance 112 is capable of transmitting power and data via the same conveyance 112 wires to the control nodes 108. The conveyance 112 maybe any suitable length. In an embodiment, the conveyance 112 may be any length where the downhole receiver embodiment sees a signal 50 mVpkpk. The cable properties mentioned function on the longest H2S (Hydrogen Sulphide) monocables and sealed cables with insulated armor (e.g. Camesa EcoSeal). A Monocable may be a cable with 1 center conductor and a return path on an outer armor. The bandwidth used (under 10 kHz audio frequencies) enable the telemetry to be applied acoustically in other fluids. The analog front end, in this case, will have a transducer for converting the acoustic energy or pressure to electrical energy; an example being a microphone 105.

In another embodiment, the conveyance 112 may be longer than 10,000 feet and have a resistance of greater than 200 ohms. In this embodiment, the capacitance may be greater than 1 µF. One example of this conveyance 112 may be a 200 ohm/2.5 µF oilfield wireline monocable. Another example of this conveyance 112 may be an 800-ohm/1.1 µF oilfield wireline monocable. The conveyance 112 may be any suitable conveyance including a heptacable, a wire run in a coiled tubing, and the like.

The controller 114, and/or offsite communication device, may send and receive data to and/or from any of the control nodes 108a-n, the downhole tools 104, the wellsite communication device 118, a network, one or more offsite communication devices (not shown) and systems associated with the wellsite 100. The one or more offsite communication devices may be similar to the controller 114, or any suitable device for controlling, monitoring, sending/receiving data to the control nodes 108a-n. The controller 114 may communicate with any of the downhole tools 104, control nodes 108a-n, the wellsite controller 118 and any associated wellsite equipment, or networks using any combination of communication devices or methods such as, wired, telemetry, wireless, fiber optics, acoustic, infrared, a local area network (LAN), a personal area network (PAN), and/or a wide area network (WAN), and the like. The connection may be made via the network to an external computer (for example, through the Internet using an Internet Service Provider), and the like. In an embodiment, the controller 114 communicates with the control nodes 108a-n using direct sequence spread spectrum encoding telemetry.

In an embodiment, the controller 114 may communicate with the control nodes 108a-n via direct sequence spread spectrum encoding transmitted via the conveyance 112. Direct sequence spread spectrum encoding is a spread spectrum modulation technique used to reduce overall signal interference and increase signal gain in processing. Direct sequence spread spectrum is a method by which a signal (e.g., an electrical, electromagnetic, or acoustic signal) is generated with a particular bandwidth that is deliberately spread in the frequency domain using a unique correlation sequence. The resulting signal has a wider bandwidth.

The direct sequence spread spectrum is used for increasing the signal to noise ratio (SNR) by implementing processing gain, versus, or in addition to, gain in the analog front end. In an embodiment, the bandwidth used is suitable for any channel that conducts audio (sub-20 Khz) frequencies. The low frequency or audio bandwidth allows the control nodes to be operated in mediums that have the least attenuation in those frequencies, typical of wireline cables and underwater. The encoded signal may be sent via the conveyance 112, or the medium inside the wellbore 106 (for example an acoustic signal in the wellbore fluids). These encoded signals may be suited to tasks that require very robust communication channels with low bit rate requirements. In an embodiment, the conveyance 112, or channel, may be a wireline, cables, water or air. In an embodiment, the signal gain achieved from the direct sequence spread spectrum signal processing can provide communication on an oilfield mono-conductor cable up to 50,000 feet long, while suppressing in-band noise. The present embodiment achieves 250 bps, which is adequate for the implemented embodiments. Bit rates greater than 250 bps may be used by boosting computation power of the controller 114 but at the expense of the need for additional computation resources. In an embodiment, there may be up to an 8% frequency drift allowance thereby eliminating the use of precise, but fragile crystals. The crystal-less operation, due to telemetry's tolerance of frequency drift, may enable the control nodes 108a-n to operate in high impact or high shock situations.

The telemetry may function with a timing crystal, a resonator or simple resistor-capacitor (RC) timer. This is accomplished by accommodating up to an 8% frequency drift between the communicating nodes.

The telemetry may support many control nodes 108a-n. For example, 100 control nodes 108a-n may be supported. Each control node 108a-n may contribute less than 1 ohm of line resistance when daisy chained.

The telemetry may be tristate. Tristate telemetry sense both the presence of digital bits (0, 1) and the absence of bits. This differs from traditional threshold based telemetry systems where one bit state is assumed if the other state is not detected.

Due to the design of the transmitter and receiver processing an embodiment requires low power. An embodiment may operate while drawing less than 5 mA during reception and less than 10 mA during transmission. The telemetry is voltage independent, in that its rating is defined by the rating of its power supply and signal coupling method. In an embodiment, the control nodes 108a-n may operate with line voltages of 1 kV. The control nodes 108a-n are only limited by the power supply and coupling method. In an embodiment, the conveyance 112 may support up to 75 control nodes 108a-n on a 20 mA current-limited power supply. In an embodiment, the control nodes 108a-n may function using as little as 50 mW of power. If current is not limited, the number of control nodes 108a-n supportable is limited by the loading of the receiver on the line. Electrically, the present embodiment may support at least 1000 nodes.

In an embodiment, the control nodes 108 can operate in temperatures of up to 200° Celsius or 3920 Fahrenheit. The optimal temperature of operation is 175° Celsius or 347° Fahrenheit. Several features make high temperature operation possible; 1) The processing algorithms for the transceiver are simplified to be able to run on minimal hardware at a reduced speed. The slower a processor is clocked, the cooler it runs, which implies the hotter the environment it supports. 2) The hardware design is simplified so that Commercial-Off-The-Shelf (COTS) higher rated automotive components may be used.

In an embodiment, the control nodes 108a-n may be inline in a daisy chain formation. In this embodiment, the control nodes 108a-n may interrupt and/or measure the power and/or signal being sent to the next node in the chain. The interruption may be facilitated by a controllable switch, as will be described in more detail below. The switch may be normally open or normally closed, depending on the requirements, of the control node 108 and/or tool 104. In an embodiment, the controller 114 may use protocols that allow the nodes' switches to determine the number of downhole control nodes 108 present and their relative switch position.

In this embodiment, the measurement may be done directly by sensing voltage and/or current, or indirectly by sensing the pass-through line's electric field (for example by using a Hall Device) for indication of power draw. The control nodes 108a-n may be low cost. The control nodes 108a-n may be configured to be active on either or both polarities. The control nodes 108a-n may be wired inline to interrupt the power cable for control over the bus. The size of control node may be very compact. In an embodiment, the size of the control node 108 is less than one square inch. Although described as being less than one square inch, it should be appreciated that the control node 108 may be any suitable size.

FIG. 2A depicts a connector 200 for connecting the conveyance 112 to the control node 108. The connector 200 may be keyed. Keying may be done differently for each connector required. The connector 200 may use a mechanical lock in addition to friction for retention to the conveyance 112 and/or control node 108. In an embodiment, the connector 200 comprises a card edge connector or pogo pins. The connector may be reinforced using a retainer 202. The retainer 202 may be a clip or any suitable retention device including but not limited to a zip tie, string, wire, and the like may be used. The robustness of the connectors 200 may allow the downhole tool 104 and/or control node 108a-n to operate in high shock environments. In an example, the connector 200 may be suitable for an impact of greater than 1 kGs. Further, the connector 200 may allow the downhole tool 104 and/or control node 108a-n to operate in elevated temperatures as described above. The connector minimizes cost in mass production by reducing touch labor required for soldering leads. The connector accommodates easier servicing and/or replacement of the assembly.

FIG. 2B depicts a diagram illustrating a schematic view of the connector 200 wherein the connector is a card edge connector.

Figure 3:
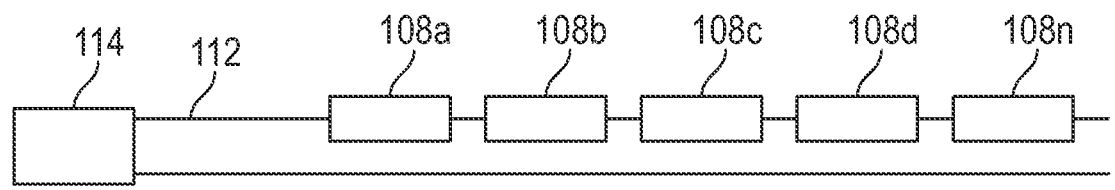
FIG. 3 depicts a schematic view of a controller, or surface master controller, coupled to a plurality of the control nodes via the conveyance.

FIG. 3 depicts a schematic view of the controller 114, or surface master controller, coupled to a plurality of the control nodes 108a-n via the conveyance 112.

Figure 4:
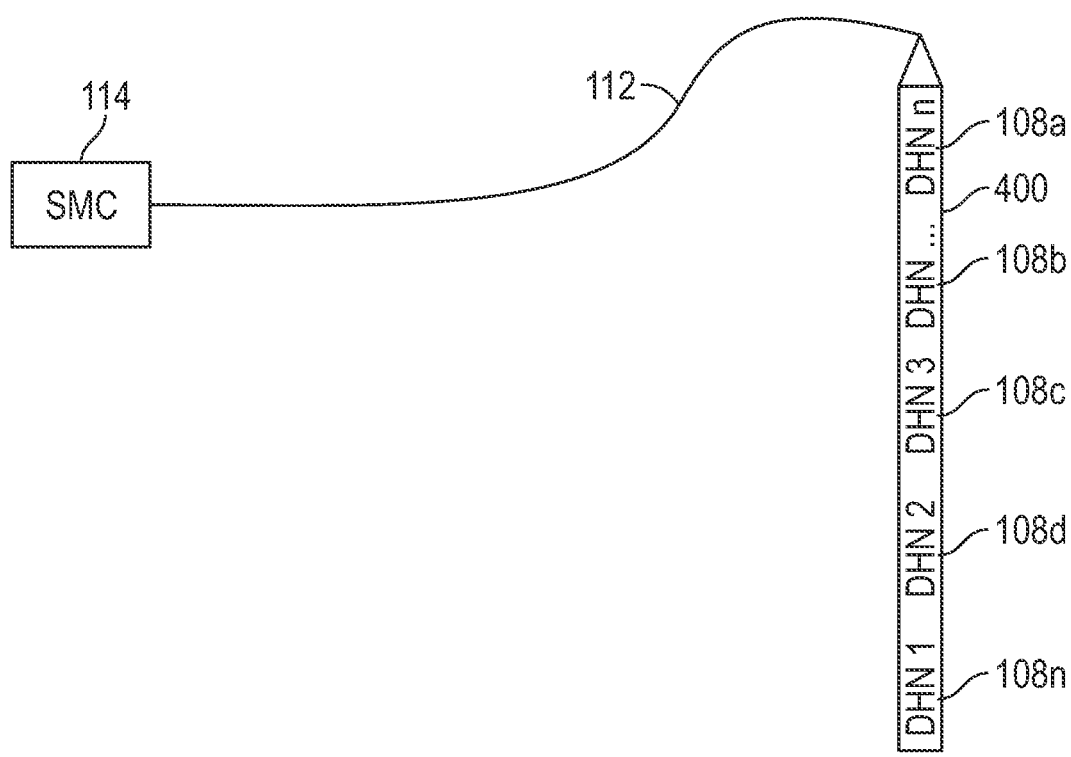
FIG. 4 depicts a schematic view of the controller, or surface master controller, coupled to a tool string a plurality of the control nodes via the conveyance.

FIG. 4 depicts a schematic view of the controller 114, or surface master controller, coupled to a tool string 400 a plurality of the control nodes 108a-n via the conveyance 112. The tool string 400 may be any number of tools 104 described above.

Figure 5:
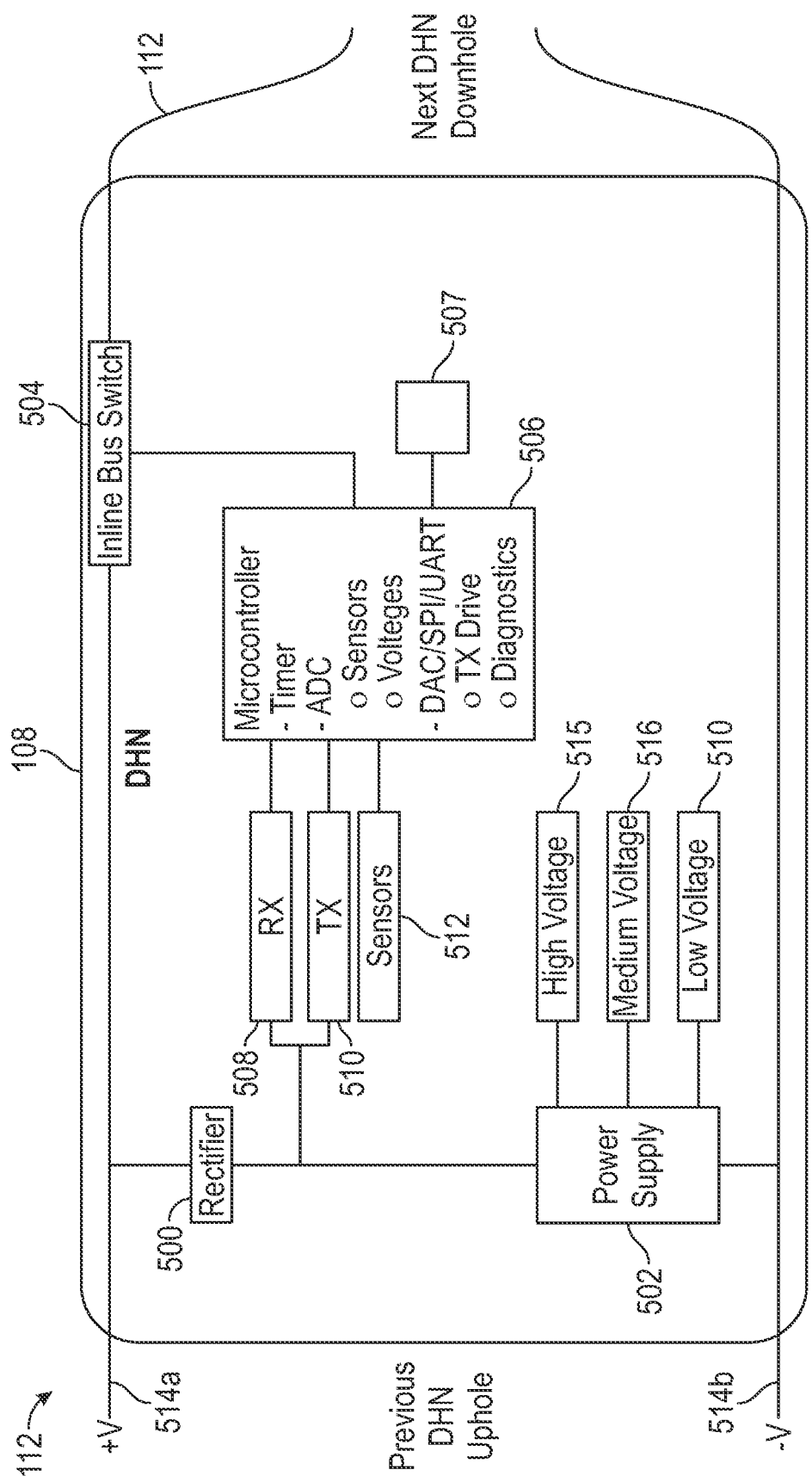
FIG. 5 depicts a schematic view of the architecture in one or more control nodes in an embodiment.

FIG. 5 depicts a schematic view of the architecture in one or more control nodes 108a-n in an embodiment. The architecture of the may be on a circuit board in an embodiment. The circuit board may have any suitable features for use in the control node 108a-n. Although the architecture is described as being present in a circuit board, it should be appreciated that it may be in any suitable medium including, but not limited to being built directly into the downhole tools such as the release tool, the perforating gun, the detonator, tension device, and the like. In an embodiment, the control node 108 may have a rectifier 500, a power supply 502, a switch 504, a microcontroller 506, a receiver 508, a transmitter 510, and one or more sensors 512. The circuit board may have a footprint of less than 2 square inches in an embodiment. Further, the circuit board may have any suitable footprint. The conveyance 112 in this embodiment may comprise two conductors 514a and 514b. The conductors 514a and 514b may supply direct current (DC) of either polarity. In an embodiment, the telemetry can have a bandwidth that includes acoustic frequencies of less than 20 KHz through the conveyance 112. The telemetry may be used to actuate any of the control nodes 108a-n. The control node 108 may be activated on either or both polarities.

The rectifier 500 may be configured to convert either polarity of DC voltage to a fixed polarity (full bridge rectification), or to enable the functionality of the node on only one polarity (single diode).

The power supply 502 may accommodate a wide input voltage range. In the present embodiments, due to the low power requirements, very simple linear power supply is used. For high power requirements, a switching power supply may be designed and used. The power supply 502 provides intermediate voltage rails (515, 518, 516) for the electronics and sensor on board.

The switch 504 may be an inline bus switch in an embodiment. As described above, the switch may be normally open or normally closed depending on the requirements of the control node 108 and/or the tool 104. The switch 504 may be any suitable switch including, but not limited to, a solid state switch (Field Effect Transistor (FET), Bipolar Junction Transistor (BJT), Solid State Relay (SSR)) or mechanical switch (Relay). If a low voltage brownout is detected, the switch 504 may be opened or closed in response to the falling head voltage, or shorted bus, downstream. In an embodiment, the switch 504, or inline bus switch may be normally open for cases where electrical isolation is needed on power up for example explosive actuators. In another embodiment, the switch 504 may be normally closed when electrical isolation is needed during operations, for example a release tool or power path routing. The switch 504 may be manipulated to determine the control nodes 108 identity and location in the downhole bus.

The microcontroller 506 may have any number of sensing, control and/or processing functions in the node 108. The microcontroller 505 may have a timer, an analog to digital converter, any number of sensors (temperature, pressure, tension, shock), voltages, digital to analog converter, serial peripheral interface, a universal asynchronous receiver transmitter, a transmitter drive, a processor, support reprogrammability, precision timers, encryption hardware, CRC hardware, a precision, calibrated RC clock, runtime erasable memory, and any diagnostic features. The diagnostics features, or diagnostic port may be any suitable diagnostic feature including, but not limited to, firmware updates, program debugging, serial trace and power on self-testing. The diagnostics or any of the functions in the microcontroller 506 may be accessed through a port (not shown). The port may be any suitable port, for example a USB port that may couple the node 108 to another computer, sensor, the controller 114 and the like. The port may allow the operator to diagnose, change, manipulate, receive and/or transmit data to the node 108 at the surface of the wellbore.

The microcontroller 506 may be coupled to a receiver 508 and a transmitter 510, or a transceiver. The receiver 508 and transmitter 510 may be configured to send data and/or power to and from the microcontroller 506. The transmitter 510 may be any suitable transmitter including, but not limited to a simple current loop transmitter. The transmitter may also be a capacitive or inductive coupled voltage drive.

The microcontroller 506 may be coupled to one or more additional sensors 512. The sensors 512 may be capable of sensing any suitable information regarding the node 108 including, but not limited to, pressure, temperature, voltage, current, shock, acoustics, and the like. The sensors 512 may send the data to the microcontroller 506 for processing and/or transmitting. The sensors 512 may be separate from and/or integrated with the microcontroller 506. The microcontroller 506 may alert the controller if the temperature falls below a minimum value, or above a maximum value.

The microcontroller 506 and or the controller 114 may record information with a recorder 507. The recorder 507 may be integral with or couple to the microcontroller 506 and/or the controller 114. The recorder may be a storage device capable of storing a digital or analog time reference. The recorder may record, track and store any suitable information about the control node 108, the downhole tool 104, and the well system. The recorder 507 may track any suitable information including, but not limited to, counting the number of arm commands received, counting the number of fire commands received, the maximum or minimum temperature observed, the maximum or minimum head voltage observed, the time of broadcasts, the time of actuation, the time of firing, the time of actuation, the time between broadcasts, the time while activating the next control node 108 in the sequence, the number of times actuations attempted after an actuation command was sent, the number of shock events observed, and the like. The number of shock events that occurred may indicate the number of control nodes fired when the control nodes are perforating guns.

Figure 6:
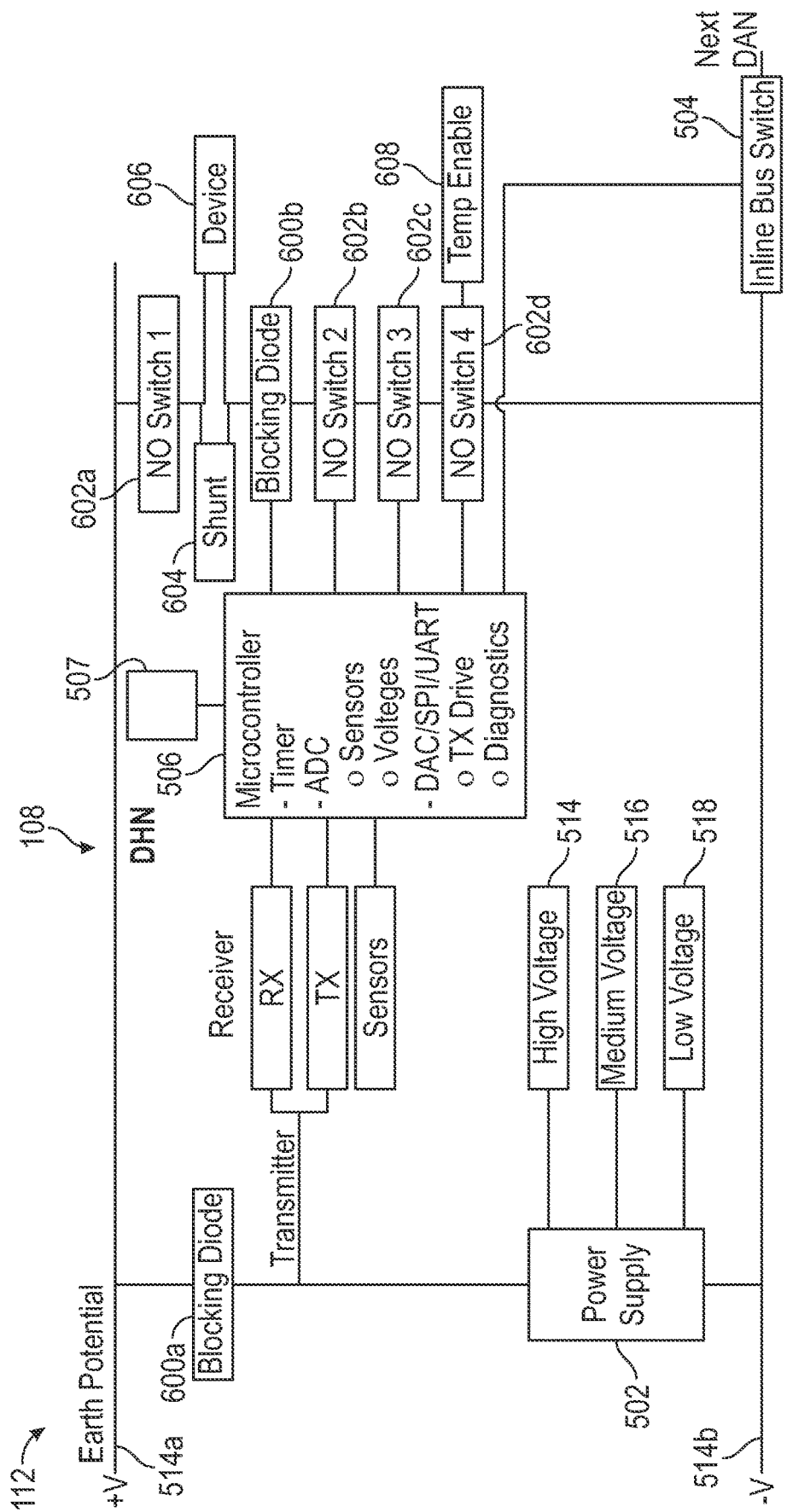
FIG. 6 depicts a schematic view of the architecture in one or more control nodes when the control node is an explosive switch.

FIG. 6 depicts a schematic view of the architecture in one or more control nodes when the control node 108a-n is an explosive switch in an embodiment. The architecture may be present on any of the forms described herein including on a circuit board. In an embodiment, the control node 108 may have one or more blocking diodes 600 a-n, the power supply 502, the switch 504, the microcontroller 506, the receiver 508, the transmitter 510, the one or more sensors 512, one or more normally open switches 602a-n, a shunt 604, a device 606, and a temp enable 608. The circuit board may have a footprint as described above. The conveyance 112 may be any of the conveyances described herein. When an embodiment functions as an explosive actuator the control node 108 is active only when there is negative polarity. If the device 606 is a release device or a device that routes power, the blocking diode 600a near the power supply 502 may be replaced with the rectifier 500 for operation on either polarity.

The blocking diodes 600 may allow current to flow in one direction while preventing it from flowing in the other direction. The power supply 502 may be optimized to have only the low voltage rail. The normally open switches 602 may be optimized for fewer physical switches. The switch 504 or inline bus switch is in the normally open position for the explosive switch. The shunt 604 allows current to flow around the actuator by supplying a lower resistance path.

The device 606, or actuator, may be any suitable device used in the wellbore 106. In an embodiment, the device is an explosive device, or perforating gun. When the controller 114 activates the device 606, the device may explode through the wellbore wall and into the formation. The device 606 may be activated by any of the methods described herein.

The temp enable 608 may be implemented to provide a microcontroller independent temperature lockout. This prevents usage of the device until a predetermined temperature is reached in the control node 108a-n.

In an embodiment, each of the control nodes 108a-n has an encryption key. The encryption key may be generated by the control node 108 or by the controller 114. The controller may use the encryption key to activate devices 606 in the downhole tools 104. The encryption key may be the same for the life of the control node 108, or may be changed at every use. In an embodiment, the encryption key may be randomly generated at each power up. In another embodiment, the encryption key may be randomly generated at defined time intervals. Commands from the controller 114 may be broadcast to the control nodes 108a-n. When the commands are broadcast, all control nodes 108 online may respond to the command. To achieve targeted communication with specific commands, payloads are encrypted with the key of the targeted control node 108. All online control nodes 108 may see the broadcast command but only the control node 108 that validate the encrypted payload will respond, in an embodiment. The targeted commands with encrypted payloads, or encryption keys, will be sent to the corresponding control node 108 to activate the device 606. In an embodiment, at startup, a broadcast key may be used directly as the encryption key or it may be derived and not physically transferred using an algorithm like the Diffie-Hellman key exchange algorithm. In an embodiment, the encryption key may be generated from an internal identification key built into one of the parts of the control node 108. If the encryption key is unique for each power cycle, a random generator either in the control node 108 or in the controller 114 may be used.

In an embodiment, any number of encryption keys may be used for a specific control node 108. Each encryption key may enforce or activate a state transition in the control node 108 as a part of a command sequence.

In an embodiment, the encryption key for each control node 108a-n may be unique. In this embodiment, one of the encryption keys (which does not change) may be used to validate the control node 108 location on subsequent power cycles when actuation is requested. The location of each control node 108 may be validated faster by observing electrical characteristics of the control node 108. In an embodiment, there is a power on overlap between control nodes 108 when enumerating them.

In an embodiment, the upper most control node 108a has the switch 504 in an open position. In this embodiment, upon applying power only control node 108a is online because of the switch's 504 normally open position. The control node 108a upon receiving power may broadcast the encryption key a specific number of times at specific time intervals. The number of times and time interval at which the encryption key is broadcast may vary by application. For each specific application the number of times and spacing of broadcasts may be fixed.

Figure 7:
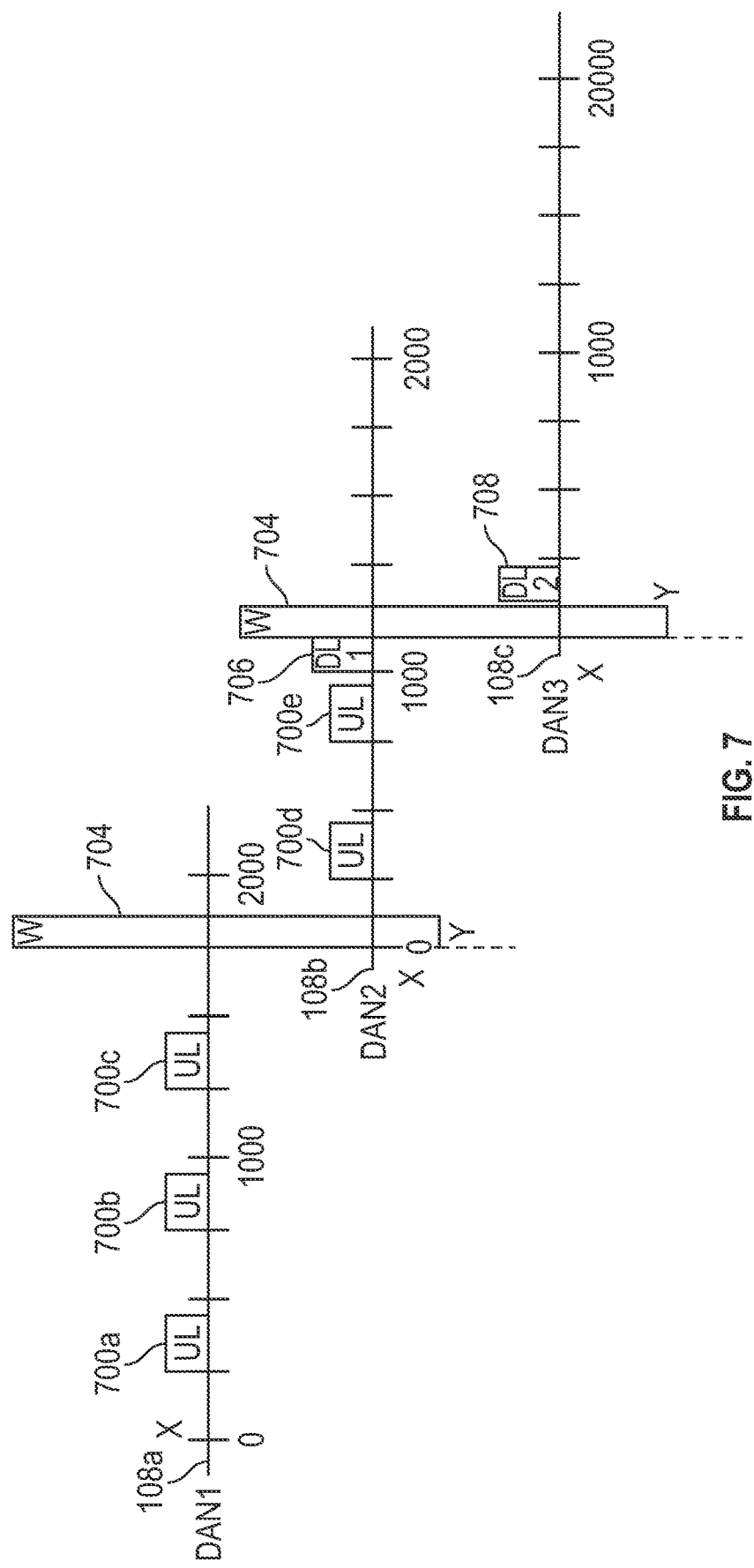
FIG. 7 depicts a graphic representation of a tool string having three control nodes in an embodiment.

FIG. 7 depicts a graphic representation of a tool string 400 having three control nodes 108a, 108b and 108c. The x-axis of the graph is time. As shown, time is in milliseconds; however, it should be appreciated that any suitable time may be used. Upon supplying power to the upper most control node 108a, the control node 108a automatically generates and/or receives three broadcasts 700a-c of its personal encryption key. After the three broadcasts 700a-c, the control node 108a may automatically connect an active power overlap 704 to the next control node 108b, this process is called nexting. The auto connect is represented by an active power overlap 704 and may occur by the three broadcasts 700a-c automatically changing the position of the switch 504 or inline bus switch. As shown, active power is left on in control node 108a while the next control node 108b is switched on. In an embodiment, the time overlap may be 50 ms. After the next control node 108b is switched on, the upper control node 108a may be switched into a low power mode or inactive mode. The inactive mode may require less power than the active mode, in an embodiment the inactive mode requires no more than 200 uA and the active mode requires no more than 4.5 mA. The activation of the control nodes 108a-n from active to inactive power may give the controller 114 a signature upon which the switching of the control nodes 108a-n may be quantified. Not shown is the time 0 wherein the control node 108 may be considered active and drawing active current.

In an embodiment, the tracking the number of control nodes 108a-n online, or active may be called inventorying. Transitioning to a control node 108-n for firing may be called nexting. Control node 108a-n instance may be detected by encryption key tracking, current level monitoring, and the like.

As shown in FIG. 7, the second, or next, control node 108b may generate and/or receive two broadcasts 700d and e. After the two broadcasts 700d and e, the control nodes switch 504 is activated as represented by a switch activation 706. Upon switch activation 706, or next command, the active power window of overlap 704 activates the next control node 108c. After the active power overlap 704, the previous control node 108b may automatically switch to inactive power and the next control node 108c is in active power mode. In FIG. 7 the last control node 108c may be selected and stopped from sending the next command 706 by sending or receiving a stop command 708 from the controller 114. The controller 114 may then send an arm or activate signal to the control node 108c to activate the downhole tool 104.

In an embodiment, the control node 108a-n may broadcast an uplink with status information including head voltage and an encryption or arming key at time intervals. The time intervals may be every 500 ms starting at 250 ms in an embodiment. Between the broadcasts, the control node 108 may be requested to switch thru. While switching thru, encryption/arming keys may be captured by the control nodes 108 and head voltage may be adjusted if it falls as the control node 108 are switched thru.

In any of the embodiments described herein, the status information about the control node 108 may include, but is not limited to, control node 108 health flags, a temperature indicator flag, a flag indicating if a firing was attempted, a flag indicating if shock was detected, a flag indicating if the node is capable of detecting shock (or any other capabilities), and a flag indicating if the uplink was the control node's 108 first.

In an embodiment, if a switch thru broadcast command is received before the 250 ms time, the switch 504 may simply pass power thru. While switching power thru, the control node 108 may wait 50 ms to ensure that the power line being switched thru is not shorted. If a short is detected, the control node may cancel the next command, or nexting, and enter low power mode or sleep. The controller 114 or surface may then timeout after a time interval. In an embodiment, the time interval is 2 seconds though it should be appreciated than any suitable time interval may be used.

In an embodiment, the control node 108 may monitor current level as an active node draws 4.5 mA and a sleeping node draws 200 µA. After issuing the next command, the present control node 108 may stay in active mode for 50 ms while the next node comes online. This may cause a 50 ms surge of two active control nodes 108 worth of current. If the next control node 108 is a short, the current will surge and next may stop. The Arming keys may still be used for firing.

Figure 8:
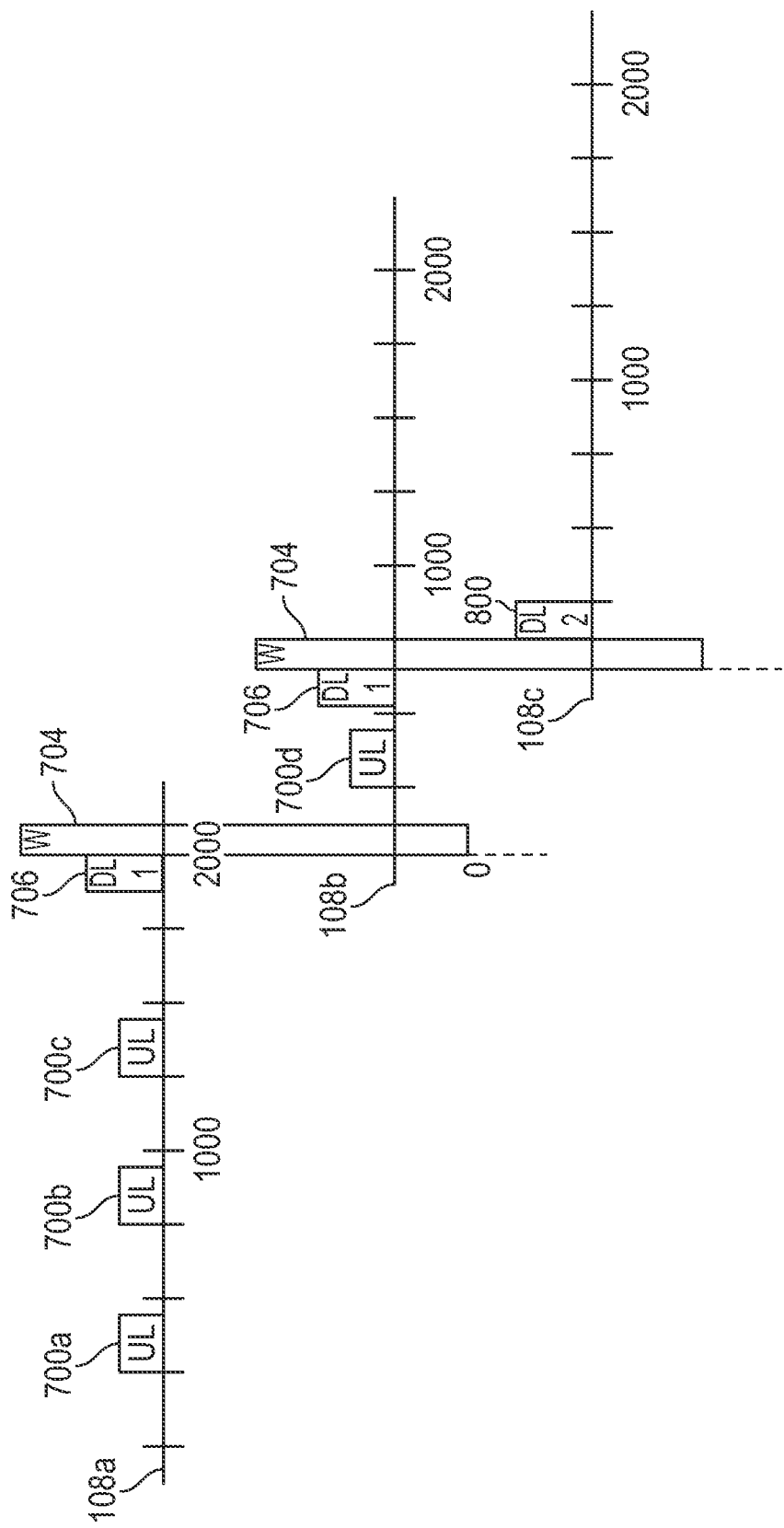
FIG. 8 depicts a graphic representation of a tool string having three control nodes in an embodiment.

FIG. 8 depicts a graphic representation of a tool string 400 having three control nodes 108a, 108b and 108c in another embodiment. In this embodiment, the uppermost control node 108a may generate and/or receive three broadcasts 700a, b, and c of its encryption code. In this embodiment, the uppermost control node 108a does not automatically send power to the next node. After the three broadcasts 700a, 700b, and 700c the control node 108a waits for the next command 706. Upon receiving the next command 706, the active power overlap 704 may be activated to provide power to the next control node 108b as described above. The power may be activated and the node placed in the inactive mode as described above upon the completion of the active power overlap 704. In this embodiment, the next control node 108b may generate and/or receive one broadcast 700d. After the one broadcast 700d, the control nodes 108b may receive a next command 706. Upon receiving the next command, the switch 504 is activated as represented by a switch activation 706 or next command. Upon switch activation 706, or next command, the active power overlap 704 activates the next control node 108c. After the active power overlap 704, the previous control node 108b may automatically switch to inactive power and the next control node 108c is in active power mode. In FIG. 8, the last control node 108c may then receive an arm signal 800, from the controller 114. The controller 114 and/or the control node 108c may then send an arm or activate signal to activate the downhole tool 104. The automatic arming or activation of the control node 108c without receiving or sending a broadcast encryption key will stop additional uplinks. The last control node 108 may be detected in the tool string if the pass through conveyance 112 or line is electrically open or short wherein no more uplinks are broadcast.

Although a stop command 708 and an arm command 800 are described, it should be appreciated that any number of commands may be sent to any of the control nodes 108a-n described herein. Further, although three control nodes are described in conjunction with FIGS. 7 and 8, it should be appreciated that any number of control nodes 108a-n and broadcasts 700a-n of encryption keys may be used to activate, count, locate, and release the downhole tools 104.

In another embodiment, the control nodes 108a-n may not require an encryption key, or may be key agnostic. In this embodiment the control nodes 108a-n may be counted as the control nodes 108a-n are switched (for example, activating the switch 504) thru by counting the uplinks. In another embodiment, the control nodes 108a-n may be counted by observing the current draw and/or knowing the active or inactive power status. In yet another embodiment, the control nodes 108a-n may be counted by observing the current signature of the active power overlap 704 times when switching thru.

In an embodiment, commands sent to the control nodes 108a-n may be broadcast without an address field. The commands may be targeted at a unique control node 108. In this embodiment, the command may be encrypted with a particular control node's 108 encryption key. The control node 108 may only recognize the encrypted command with the encryption key for that command. This may be true even when multiple control nodes 108 receive the encrypted command, for example, when an inline switch or switch 504 fails short thereby connecting the next control node 108.

In another embodiment, separate encryption keys may be used for different commands. In this embodiment, the control node 108 may be configured as a command state machine. In this embodiment, each command response may generate a new encryption key for the next state transition. If an unexpected or invalid encryption command or payload is seen by the control node 108, the command state machine may be reset. On reset, the state machine expects the command for the first state transition with a known key.

In another embodiment, the control nodes 108a-n may generate the encryption keys. In this embodiment, targeted communication or commands are configured to interact with the control node 108 generated encryption keys. For example, commands sent from the controller 114 to the control node 108 may be encrypted, or have encrypted payloads, which the control node 108 must decrypt successfully. Upon decrypting of the matching command for the encrypted key of the specific control node 108, the control node 108 may actuate or perform any task described herein. The encryption keys generated by the control nodes 108*a-n* may be generated by any suitable method including, but not limited to, being generated from a random number generator, being derived from pre-existing die identification numbers assigned by a part manufacture, numbers assigned by a programmer, and the like.

Figure 9:
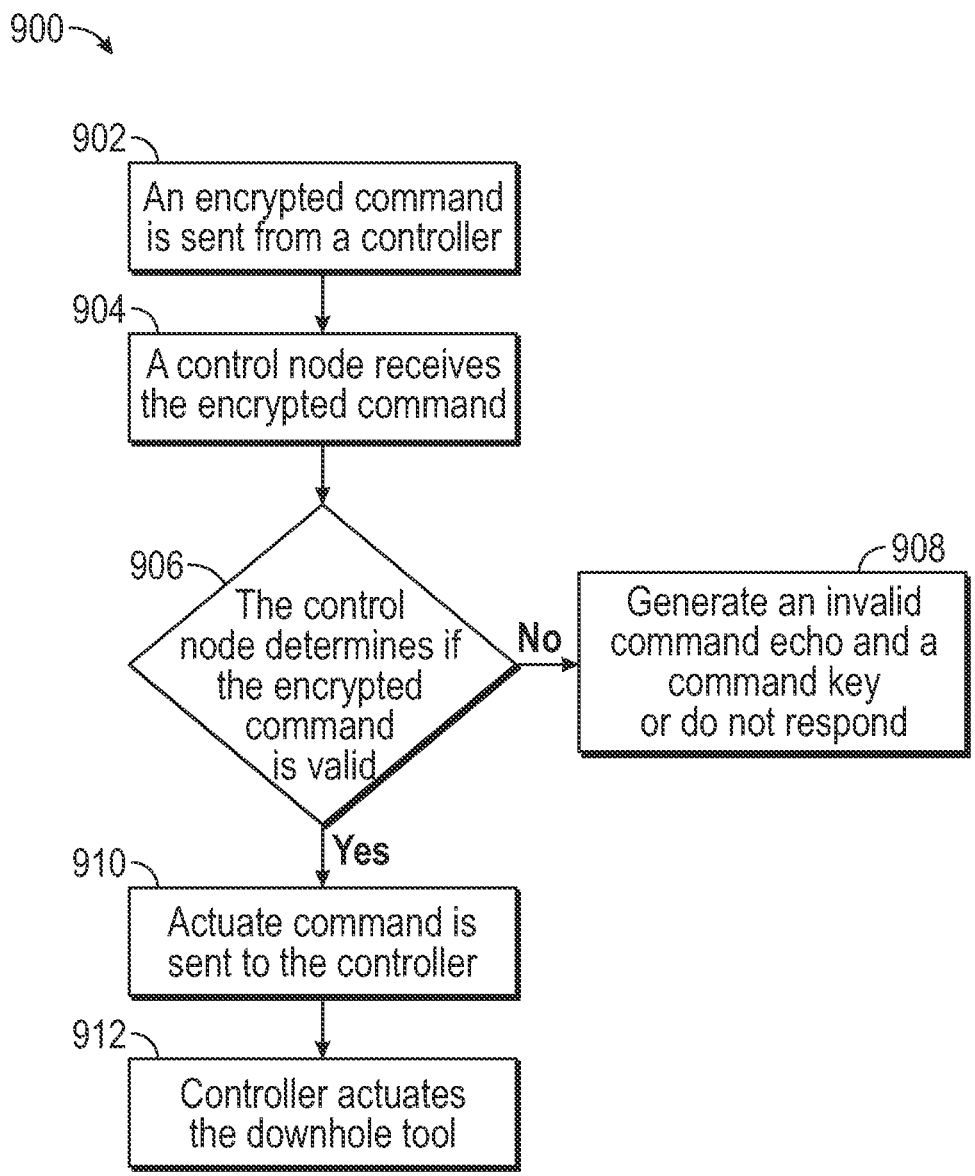
FIG. 9 depicts a flow chart for actuating a control node in an embodiment.

FIG. 9 depicts a flow chart 900 for actuating a control node 108 in an embodiment. In this embodiment, the control node 108 is an actuate state machine. The flow chart begins at block 902 wherein an encrypted command is sent from the controller 114. In one embodiment, the command may be an arm command. The flow chart continues at block 904 wherein the control node 108 receives the encryption code. The flow chart continues at decision block 906 wherein the control node 108 determines if the encryption key is valid. If the encryption key is invalid, the control node may or may not generate an invalid command echo as shown in block 908. If the encryption key is valid the control node 108 may generate an actuate encryption key back to controller 114 as shown in block 910. In an embodiment, this actuate command encryption key may be valid for a specific period. After this time interval, the command, or actuate command will not work. This may reset the actuate state machine to require or expect another encrypted command, or arm command. The flow chart may continue at block 912 wherein the controller 114 and/or the control node 108 actuate the downhole tool 104.

In another embodiment, the control node 108 may send an encrypted command word, or actuate word, to the controller 114 upon receiving a valid encryption key. If the encrypted command word is invalid, the control node 108 or the controller 114 may respond with a command invalid command echo, or not answer. If the encrypted command word is valid, the control node 108 or the controller 114 may respond with a actuate command. The control node 108 may then wait for the controller 114 to actuate the control node 108 and thereby the downhole tool 104.

In an embodiment, if the time limit of the encryption key has expired, the control node 108 and/or the controller 114 may reset the encryption key and/or the encrypted command and resend either.

The controller 114 may actuate the control node 108*a-n* and thereby the downhole tool 104, by applying a higher voltage to the actuated control node 108. When the sent voltage crosses the voltage threshold, the control node 108 will actuate the device 606 and/or downhole tool 104. In an example, the head voltage must exceed the voltage limit within the command timeout period. The voltage limit may be within any suitable range of voltages for example between 25 vdc and 100 vdc. In an embodiment, the voltage limit is 75 vdc.

In one embodiment, there may be specific criteria required for the control node 108 to actuate the downhole tool 104 when the control node 108 is in actuate, or command, mode. For example, the system may require the head voltage to exceed a voltage limit of 75 vdc within the actuate timeout period, the controller 114 observes a temperature below a minimum value and at least 300 mA flows in the actuation circuit for disabling of a passive shunting mechanism.

The system described herein may protect unintended actuation by the direct sequence spread spectrum telemetry rejecting in-band noise. In addition, the unintended actuation may be prevented by requiring the total signal energy to exceed a set threshold, or requiring the bit energy to be within a defined range of the total signal energy. In addition, the unintended actuation may be prevented by requiring a greater than 20 dB signal gain to be achieved in signal processing with noise suppression. In addition, the unintended actuation may be prevented by the telemetry receiver flushing a frame if no bit is detected rather than assuming one-bit state if the other state is not detected. In addition, the unintended actuation may be prevented if all frames are CRC checked. In addition, the unintended actuation may be prevented if only valid frames are interpreted by the application and invalid frames are ignored or discarded. In addition, the unintended actuation may be prevented if communication voltages are below the voltage needed for actuation.

In an embodiment, the frequency, phase and/or amplitude based modulation may be applied with the spectrum spreading technique. For example, a 6 kHz carrier is encoded with differential phase after spreading for an effective data symbol rate of 250 bits per second. An example spreading sequence may have 12 chips that are substituted in 1 bit, each chip having 2 carrier cycles at 6 kHz. In this example ((6 Khz carrier)/(2 cycles))/(12 chips/bit)=250 bit/second.

Although the telemetry is described as using direct sequence spread spectrum encoding, it should be appreciated that the telemetry may use orthogonal frequency division multiplexing (OFDM) with any of the method or systems described herein. In this embodiment, the hardware may include accelerated fast Fourier transforms. The DSSS may provide processing gain independent of the hardware gain of the analog front end, while the OFDM may allow avoidance of noisy bandwidths.

Any of the control nodes 108*a-n* may have many safety features. The safety features may include, but are not limited to, communication channels using tristate DSSS telemetry, Cyclic Redundancy Checked (CRC) protected data frames, Hamming (7,4) protected commands, encrypted command sending, encrypted command receiving, a keyed state machine, and the like. Hardware safety features may include, but are not limited to, a passively shunted actuator, microcontroller independent shunted actuator, no single point of failure, high voltage standoff (−1 KVDC to 1 KVDC), temperature shutdowns, microcontroller dependent and independent temperature disables, and very low voltage communications. The safety features described herein may be controlled by a combination of the microcontroller 506 and/or the controller 114 and may be partially or wholly in either.

In another embodiment, the control nodes 108*a-n* may be capable of performing more than one downhole tool function. The control node 108 may dynamically reconfigure itself to be a different tool on command. For example, the switch 504 may be commanded to be a release tool after the node was a perforating gun. Although described as being able to reconfigure from a perforation gun to a release tool it should be appreciated that the control node 108 may be able to change from any of the downhole tools described herein.

The DSSS telemetry may encode digital information in the system using fixed pseudo random sequences (PRS). The pseudo random sequences may be pre-differentially encoded into the control nodes 108a-n and/or the controller 114. The recovery of the digital information may be accomplished using an optimum incoherent demodulator or incoherent autocorrelator, followed by a correlator that searches for the pseudo random sequence.

In an embodiment, optimum pseudo random sequences with known ideal autocorrelation properties, Barker codes, were analyzed with the control nodes 108 and/or controller 114. The results are in Table 1 below.

TABLE 1

| Sequence Length | Sequence | Side lobe level ratio (dB) |
|---|---|---|
| 3 | 110 | −9.5 |
| 4 | 1101 | −12 |
|  | 1110 |  |
| 5 | 11101 | −14 |
| 7 | 1110010 | −16.9 |

TABLE 1-continued

| Sequence Length | Sequence | Side lobe level ratio (dB) |
|---|---|---|
| 11 | 11100010010 | −20.8 |
| 13 | 1111100110101 | −22.3 |

Figure 10:
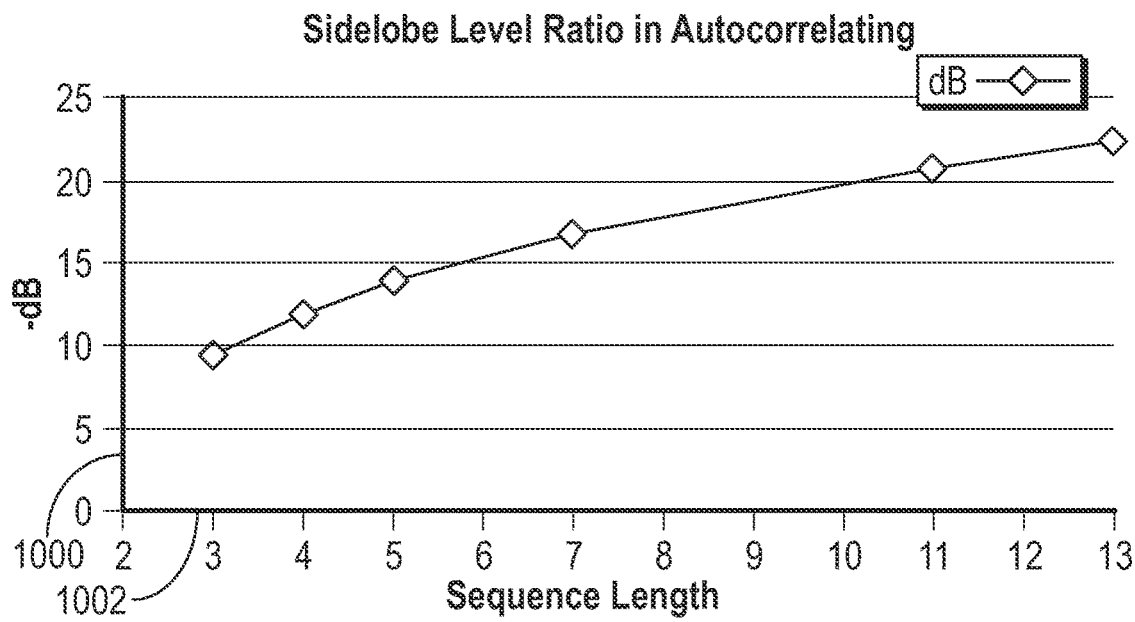
FIG. 10 depicts a graph showing a graphical representation of a sidelobe level ratio in autocorrelation.

FIG. 10 depicts a graph showing a graphical representation of a sidelobe level ratio in autocorrelation. The Y-axis 1000 depicts side lobe to peak correlation ratio in decibels −dB and the X-axis 1002 depicts the sequence length. In dispreading the signal, the side lobes (or uncorrelated signal) are suppressed by the ratio shown. The processing complexity may increases as the sequence length increases. In one embodiment, a sequence length of 11 may be used for the digitally encoded data sent and/or received by the control node 108 and/or the controller 114. Although described as having a sequence length of 11, it should be appreciated that any suitable sequence length may be used including but not limited to, 3, 4, 5, 7, 11, 13 and any combination thereof.

Pre-differentially encoding the chipping sequence is only possible if the 0 or 1 bit encoding ends with the assumed chip (initial state) of the differential encoder (DE) for the next bit. For analyzing chipping sequences, a chip (not shown) may be added to the control node 108 and/or the controller 114. The added chip for differential encoding simplicity may be at the expense of wasted bandwidth.

Table 2 below depicts a differential encoded sequence.

TABLE 2

| Sequence Length | Chip Sequence | + Chip | Chip Encoding [bit value] - (DE initial state) substitution chips | Wasted BW (%) |
|---|---|---|---|---|
| 3 | 110 | 0 | [1] - (1)0111<br>[0] - (1)1101 | 25 |
| 4 | 1101<br>1110 | 0 | [1] - (1)01100<br>[0] - (1)11001<br>[1] - (1)01000<br>[0] - (1)11101 | 20 |
| 5 | 11101 | 0 | [1] - (1)010011<br>[0] - (1)111001 | 16.7 |
| 7 | 1110010 | 0 | [1] - (1)01000111<br>[0] - (1)11101101 | 12.5 |
| 11 | 11100010010 | 1 | [1] - (1)010000111001<br>[0] - (1)111010010011 | 8.3 |
| 13 | 1111100110101 | 1 | [1] - (1)01010001001101<br>[0] - (1)11111011100111 | 7.1 |

Table 4 depicts telemetry frame layout in an embodiment.

TABLE 4

| PRE | SYNC | Type | ADDR/KEY* | CMD | LEN* | PAYLOAD* | CRC | POST |
|---|---|---|---|---|---|---|---|---|
| 4 | 4 | 4 | 16 | 8 | 8 |  | 8 | 4 |
|  | 1101 |  |  |  |  |  |  |  |
| 16 ms of |  |  |  |  |  | PAYLOAD | Applies to bytes | (1's) |
| Fc Tone |  |  |  |  |  |  | after Type field |  |
| (chip 1's) |  |  |  |  |  |  |  |  |
|  | 48 ms |  | 64 ms | 32 ms | 32 s |  | 32 ms | 16 ms |

In another embodiment, the control node 108 and/or the controller 114 may be a simple transmitter. In this embodiment, each bit may be replaced by the substitution chip sequence before modulating. After modulation, the bit sequence may be bit banged for current pulsing to the surface, or controller 114. This may be accomplished by using a serial peripheral, a raw General Purpose Input/Output (GPIO), or may be inductively coupled using a digital to analog output drive.

Figure 11:
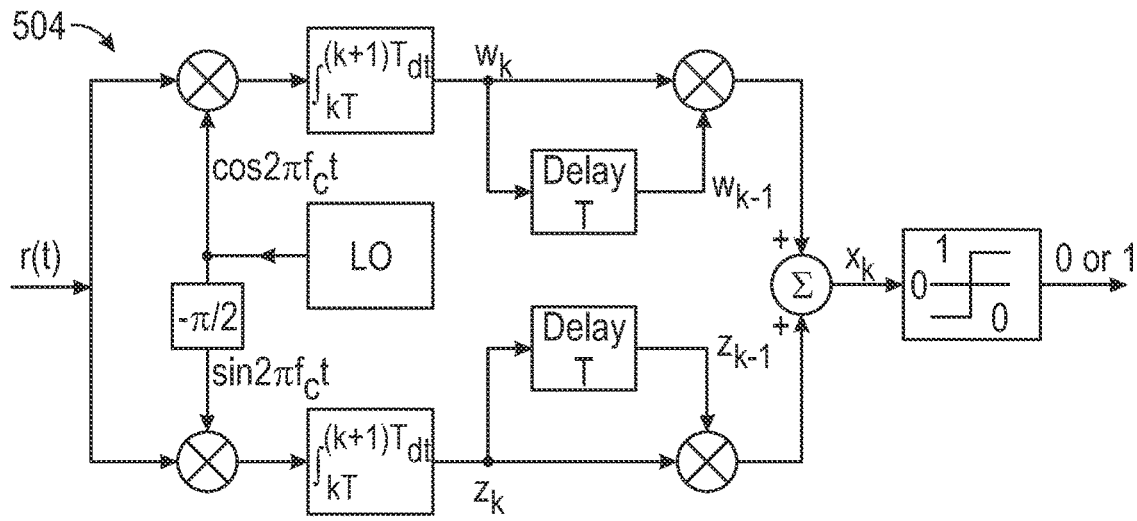
FIG. 11 depicts a schematic of a receiver in an embodiment.

FIG. 11 depicts a schematic of the receiver 508 in an embodiment. The receiver 508 shown in FIG. 11 comprises an optimal non-coherent DPSK receiver.

Figure 12:
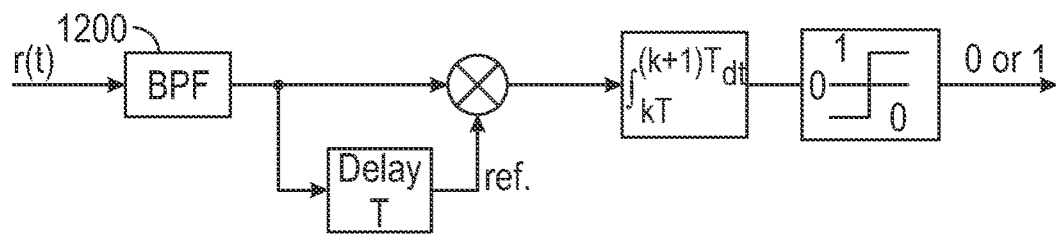
FIG. 12 depicts a schematic of the receiver in an embodiment.

FIG. 12 depicts a schematic of the receiver 508 in another embodiment. The receiver 508 shown in FIG. 12 comprises a sub-optimal demodulator that has fewer multiplications and lesser frequency sensitivity. The tradeoff is needing a bandpass filter 1200 (BPF) at its input with a passband of $0.5<=1/T<=1.5$.

In an embodiment, the number of chips per cycle may be 2 cycles per chip and the number of samples per cycle may be 4 samples per cycle. These were found to be toward the lower limit of the chips per cycle and the samples per cycle. Specifically, on longer cables with higher capacitance, the $1^{st}$ cycle is lost in signaling a chip. It should be appreciated that the chips per cycle and the samples per cycle may be increased or decreased to any suitable value.

Figure 13:
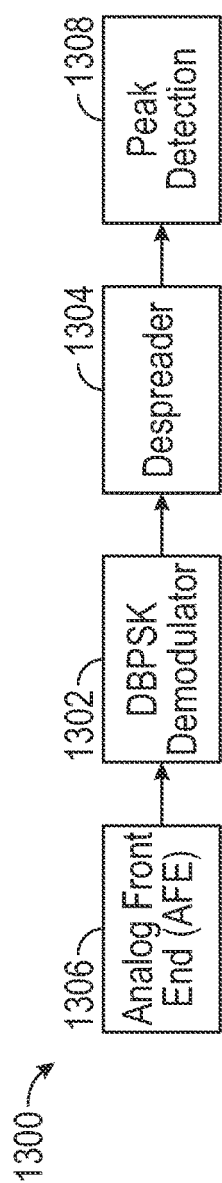
FIG. 13 depicts a flowchart of receiver optimization steps in an embodiment.

FIG. 13 depicts a flowchart 1300 of receiver optimization steps in an embodiment. The steps in the flowchart 1300 may be used to select control nodes 108a-n receiver 508. The flow starts at block 1306 (AFE) where the electrical signal enters the control node. It should be appreciated that the signal may be any signal described herein including acoustic, digital electric signals. It may enter the AFE through a microphone or any suitable method. Block 1302 is the DBPSK Demodulator that phase decodes the signal and applies a low pass filter. The flow continues at block 1304 wherein a despreader is used. The flow continues at block 1308 wherein peak detection of the signal is done to determine bits received.

In an embodiment, there may be no optimization of the receiver 508. This embodiment may comprise a receiver 508 for a carrier frequency of 8 kHz and benchmarked using an ARM M0+ for ~10 mA of current draw without the use of any peripheral optimizations. For lower power draws and simultaneous sampling of other data, an embodiment with optimizations with a carrier frequency of 6 khz has a current draw of 3 mA.

Figure 14:
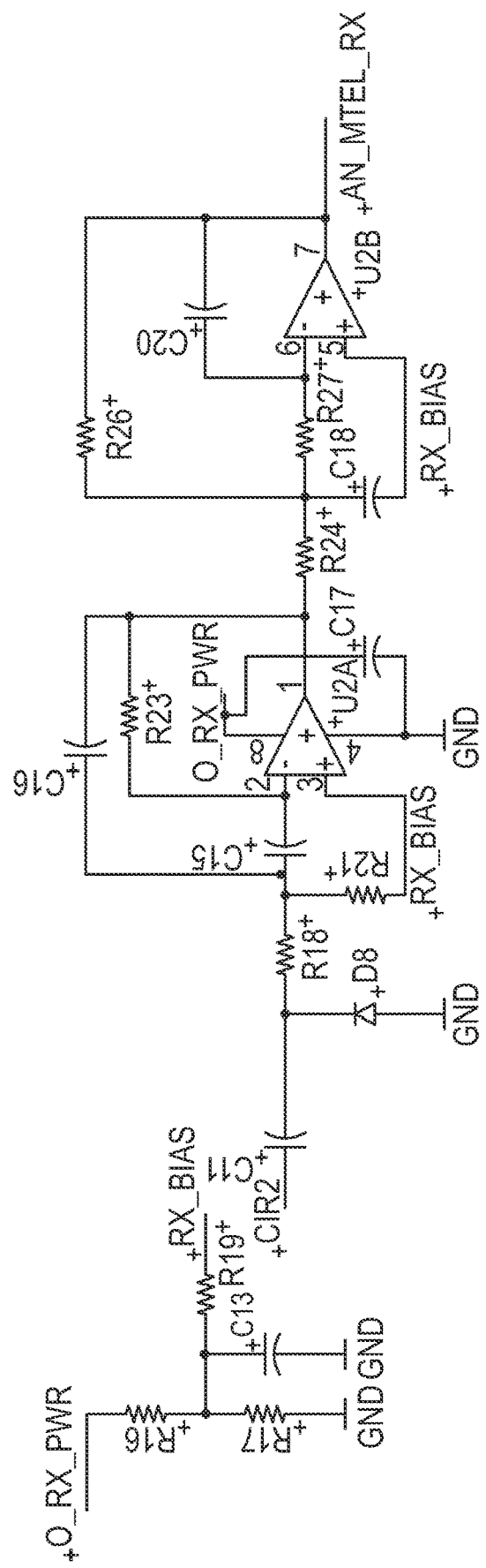
FIG. 14 depicts a schematic diagram of an analog front end (AFE) in an embodiment.

FIG. 14 depicts a schematic diagram of an analog front end 1400 (AFE) in an embodiment. Any of the receivers 508 described herein may be the AFE 1400 receiver. The AFE 1400 hardware may comprise a voltage clipper followed by a 4 pole multiple feedback (MFB) bandpass filter implemented as a HPF followed by a LPF, instead of 2 band pass filters. Even though active filters may be used, simple passive filters will also function. The simple filters may function at a reduced performance for the same filter order. The AFE may capacitively couple with the power line and/or conveyance 112. Inductive coupling is also possible.

Figure 15:
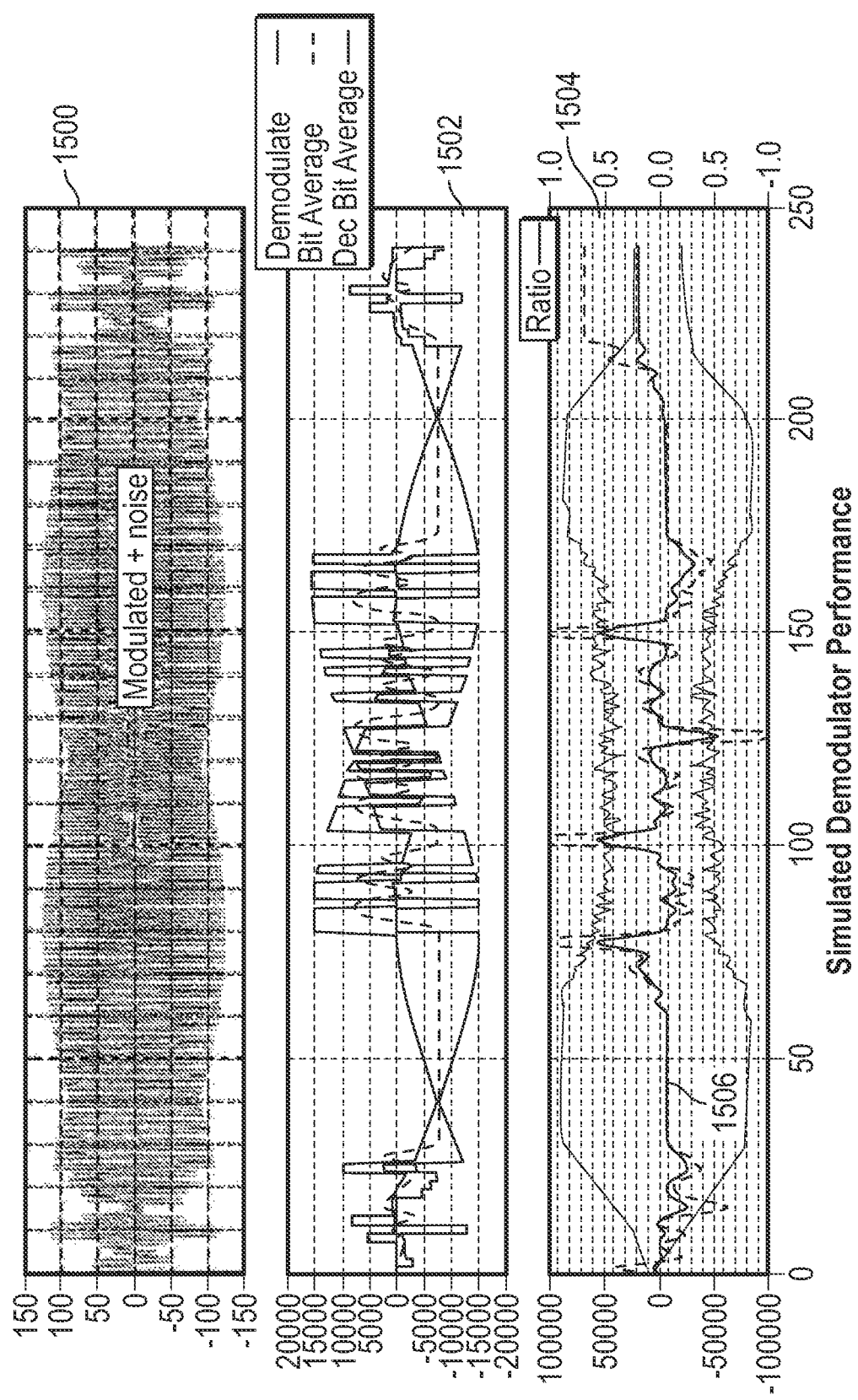
FIG. 15 depicts simulated demodulator performance in an embodiment.

FIG. 15 depicts simulated demodulator performance in an embodiment. The top most graph 1500 depicts the modulated sequence with a 4-bit preamble and postamble with 4 bits transmitted. The middle graph 1502 depicts the output of the demodulator. The bottom graph 1504 depicts the despreader, where the line 1506 depicts the ratio of match energy to total energy. The line 1506 reveals the bit sequence 1101.

Figure 16:
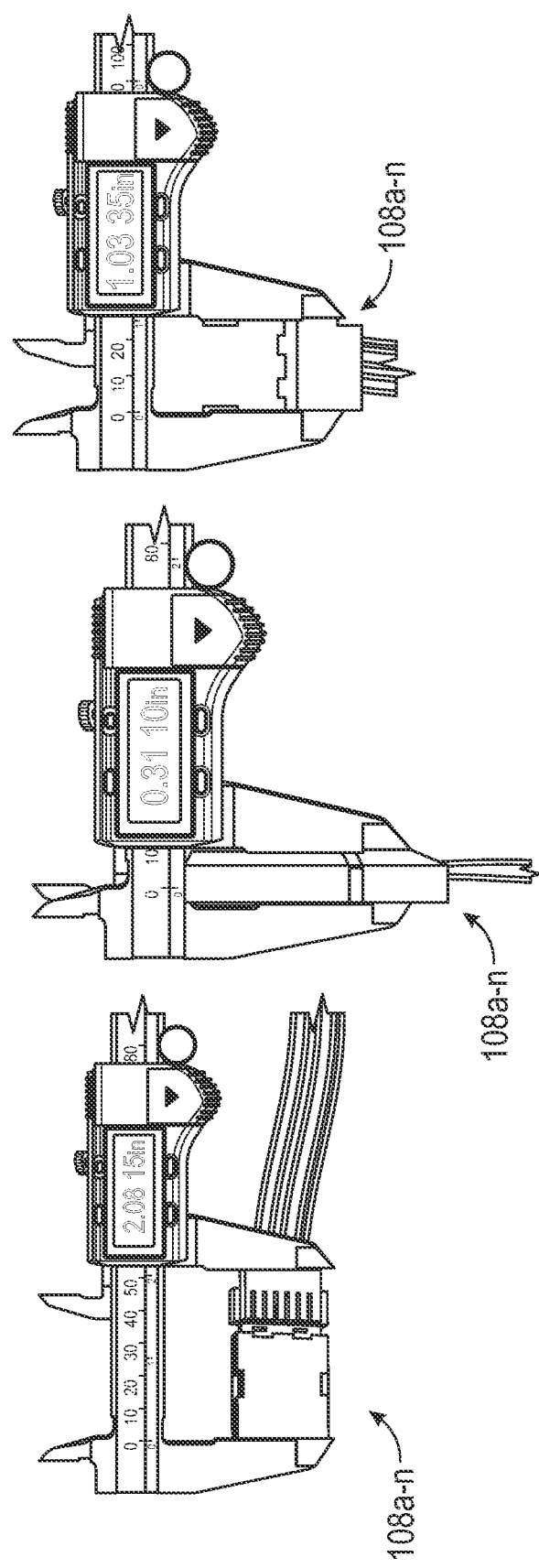
FIG. 16 depicts a view of an example of a control node 108A-N showing the size of the control node in an embodiment.

FIG. 16 depicts a view of an example of a control node 108A-N showing the size of the control node in an embodiment.

In an embodiment, cascaded integrator comb (CIC) filters may be used as averagers and sample rate changers. The CIC's are used in the demodulator, before the despreader, for better performance of the bit recovery.

In an embodiment, the control node 108a-n may have a demodulator. The demodulator may use a hardware multiplier and 1 bit long averager that calculates DC offset for the calculation of a signed sample input. The demodulator may execute at 4 samples per cycle. The low pass filter of the demodulator may be implemented as a 3 stage CIC with decimation. Embodiments may use fewer stages or more stages where more stages give a sharper cutoff response.

In an embodiment, the control node 108a-n may have a despreader. The despreader may run at 4 samples per chip which may be half the sample rate. The despreader may continuously calculate signal power level and match power level. When calculating signal power level, instead of calculating the sum of squares, a sum of absolutes may be used over 1 bit. When calculating match power level, the sum of the products of chipping sequence may be used and the despreader samples over 1 bit.

In an embodiment, the 4-bit preamble and postamble may introduce a measureable separation of total and match energies and may be used for start of frame detection and end of frame confirmation.

In an embodiment, the control node 108a-n may search for a peak within 12.5% bit time of the previous peak. If a peak is not found within than tolerance, the control node 108 may flush the frame and search for a new preamble.

The telemetry processing method may be used in resource constrained systems for detecting environmental properties through echo detection. For example, the echo detection may be used in a completions inspection of the wellbore. The completions inspection may be in conjunction with imaging or logging of the wellbore.

The telemetry processing method may be used for information transfer in other media that has different bandwidth specifications. In this embodiment, signal gain may be achieved in signal processing for an audio bandwidth. This method may be applied to other frequency bands.

Any of the control nodes 108a-n described herein may have an actuator trigger and a detonator controller. The actuator trigger may be on a single polarity. A negative voltage powered node may switch power to a detonator for actuation.

In an embodiment, any of the control nodes 108a-n may operate at low power (4.5 mA active current, 200 uA sleep current), high voltage (~700V DC power supply), and high temperature (175-200 degrees C.). An embodiment may disable the control node 108a-n on one polarity via telemetry.

In another embodiment, any of the control nodes 108a-n may operate at low power (4.5 mA active current, 200 uA sleep current), high voltage (+600V DC power supply), and high temperature (175 degrees C.). An embodiment may further comprise long haul power line telemetry and fault isolation of downstream faults with a Normally Closed thru power switch that is commanded open before toolstring release.

In an embodiment, the control nodes 108a-n may be daisy chained with high-speed control node 108a-n selection (switching through nodes at 4 node per seconds) and over more than 50 control nodes 108a-n can be supported.

An embodiment may comprise long haul power line telemetry.

An embodiment may comprise fault isolation of downstream control nodes 108a-n with a normally open thru power switch 504.

Simultaneous analog measurements may be taken for the monitoring of voltage rails for fault isolation (head voltage and low voltage) and from other sensors (e.g. thermistor) or any of the sensors described herein.

For an embodiment, cost optimized packaging may comprise an edge connector for oriented and keyed field operator hookup and for minimizing manufactured costs. This connector may be any of the connectors 200 described herein.

It should be appreciated that any control node 108 or tool described herein may be in parallel with other suitable tools in the toolstring.

An example embodiment's protocol is optimized for the tradeoff of complexity and bit rate of direct sequence spread spectrum encoding. The higher the bit rate, the more complex the transceiver processing required. The example data rate of a relatively slow 250 bps was chosen in an embodiment and, as a result, the telemetry frame was optimized to have optional fields, as denoted by an asterisk (*). The optimization keeps the telemetry frame at a minimal number of bits.

CMD/LEN Combination
  Disable/Disable is a NULL frame and may be used for synchronization. The CRC field is suppressed for this case.
  Disable/Enable is an application specific information frame.
  Enable/Disable is a typical command sent with no payload.
  Enable/Enable is a typical command sent with a payload.
  CRC is calculated from the Sync field using the Normal CCITT-8 (polynomial 0x07).

An embodiment may comprise a modem that may be either one of two states, active or inactive. Each state may draw a specific current from which the number of control nodes 108a-n online may be determined at the controller 114. An example active current could be 4.5 mA, and an example sleep current could be 200 uA. An example transmit current could be pulsing at 5 mA. Input voltage could range from 5V to 1 kV.

While the embodiments are described with reference to various implementations and exploitations, it will be understood that these embodiments are illustrative and that the scope of the inventive subject matter is not limited to them. Many variations, modifications, additions and improvements are possible.

| Name | PRE | SYNC | Type | Address* | CMD* | LEN* | PAYLOAD* | CRC* | POST |
|---|---|---|---|---|---|---|---|---|---|
| Bits | 4 | 4 | 4 | 16 | 8 | 4\|\|8 | | 8 | 1 |
| Description | 16 ms of Fc tone (chip 1's) | 1101 1110 | | | Command | Payload Size (bytes) | | Applies to bytes after the Type field | (chip 1's) |
| Time | | 48 ms | | | 64 ms | 32 ms | 16 ms | 32 ms | 4 ms |

PRE and POST
PreAmble and PostAmble—+ve sine waves representing physical wire 1's are equivalent to 0's being encoded with an assumed 1 first bit. This provides a locking tone, if needed.
  For the SYNC Column.
The downlink is always DSSS encoded.
If the Sync code is 1101, the uplink is also DSSS encoded.
If the Sync code is 1110, the uplink is 5.56 kbps (180 us) CFSK (Continuous Phase Frequency Shift Keying)
The frame is identical to the low speed format with the exception of a Preamble of 10 0's
  Type
  This defines the frame format; d is don't care,
    bddd–b=1 (uplink) or 0 (downlink)
    dbdd–b=1 (enable) or 0 (disable, i.e. broadcast) 16 bit Address field
    ddbd–b=1 (enable) or 0 (disable) CMD field.
    dddb–b=1 (enable) or 0 (disable) Len field
      If Len field is disabled, the payload is absent
      If Len field is enabled, payload has Len+1 bytes
Address is optional. The DHN Address may be assigned and/or derived by either SMC or DHN. The address is sent MSB first
CMD is optional. 16 secure commands are defined with Hamming (7,4) and the MSb (most significant bit) set to 0. When the MSb is 1, 112 non-safety related commands (128-16) are defined.
LEN is optional. This is a 4 bit field, where for MSb=1, the 4 bits are the least significant nibble of the total length field. For MSb=0, up to 8 payload bytes are defined, for MSb=1, 128 payload bytes. LEN+1 is the number of payload bytes, since the absence of the field already indicates a 0 byte payload.

Plural instances may be provided for components, operations or structures described herein as a single instance. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:
1. A method for actuating a downhole tool, comprising:
  encrypting a command or commands;
  transmitting said encrypted command or commands from one or more controllers, via a conveyance, to one or more control nodes in at least a portion of at least one downhole tool using a direct sequence spread spectrum signal (DSSS) transceiver with telemetry;
  receiving said encrypted command or commands at one or more control nodes in a wellbore;
  decrypting said encrypted command or commands at one or more control nodes;
  determining the decrypted command or commands are valid for a specific control node or nodes;
  determining said decrypted command is valid for a specific control node task; and
  actuating, or performing a defined action, actions, task or tasks, in a targeted control node or nodes.
2. The method of claim 1, wherein said encrypted command, upon decryption, may be directed to a specific node or nodes, directed to a specific node action, actions, task or tasks and valid for a specific period of time or a combination thereof.

3. The method of claim 1, wherein actuating said downhole tool or tools by said one or more control nodes is further defined by control nodes electrically configured in series, parallel, or a combination thereof.

4. The method of claim 1, wherein actuating a downhole tool may further comprise applying a voltage signature to said one to a plurality of control nodes having one or more thresholds or patterns for achieving actuation.

5. The method of claim 1, wherein said one or more control nodes may send encrypted data to and receive encrypted data from said controller, said controller may send encrypted data to and receive encrypted data from said control node, or a combination thereof, at transmission rates greater or equal to 250 bits per second (bps).

6. The method of claim 5, wherein said control node or control nodes may interface with one or more actuators, one or more sensors, or a combination of both, for conveyance of encrypted data bidirectionally.

7. The method of claim 6, wherein a node specific, node action specific, node task specific, or a combination thereof, of encryption keys may be pre-programmed into, or generated by, said control node or said controller and broadcast to, or requested by, said controller for controlling, monitoring, and sending encrypted data to and receiving encrypted data from said at least one downhole tool; and said encryption key or keys broadcasting a specified number of times at specific intervals to actuate, count and/or locate said at least one downhole tool.

8. The method of claim 7, wherein said encrypted data sent from a controller to a control node may consist of a command or a request and encrypted data from a control node or control nodes may consist of pressure data, temperature data, voltage data, current data, shock data, and acoustic data, or the like.

9. The method of claim 1, wherein said control node may be configured to record, track and store status and digital or analog command data to a non-volatile memory for subsequent analysis.

10. The method of claim 9, wherein status and digital or analog data may include: number of commands;
type of commands;
timing of commands;
success and failure of commands; and
conditions experienced at said control node or nodes.

11. The method of claim 10, wherein said conditions experienced at said control node or nodes may be pressure, temperature, tension, acoustics, physical shock, a voltage event, current draw and the like.

12. The method of claim 1, wherein said one or more control nodes are configured to initialize on power up for different functionalities by checking a non-volatile memory.

13. The method of claim 7, wherein actuating the downhole tool comprises sending one, more than one, the same, different, or a combination thereof, encrypted commands, via said conveyance, from said controller to said control node and said control node to said controller.

14. The method of claim 1, further comprising actuating a control node in one or more additional downhole tools by encrypted command to one or more successive inline bus switches in said control nodes for downhole tool's or downhole tools' actuation.

15. The method of claim 1, wherein said one or more control nodes operates by protecting an associated actuator from stray voltages or currents, such as RF induced power, using one or more redundant positive thermal coefficient (PTC) thermistors, wherein such protection provides a current path that bypasses the actuator where deactivation of the protection is achieved through application of actuation power and/or increased well temperature and wherein said thermistor may further be protected by an inline fuse to mitigate failing shortcircuited.

16. The method of claim 1, wherein each said one or more control nodes controlled by a controller has an inline bus switch configured to be normally open in a first position, and wherein in the first position said bus switch is configured to activate said one or more control nodes in the next lower downhole tool, or normally closed in a second position, and wherein in said second position said bus switch is configured to deactivate said one or more control nodes in the next lower downhole tool, dependent on the requirements of the control node or nodes, said downhole tool or tools, or a combination thereof.

17. He method of claim 1, wherein said controller is configured to count the number of control nodes on a conveyance and is further configured to determine the order and switch position of said control nodes on said conveyance and wherein the order is stored by caching said one or more control nodes' encryption keys or by tracking current draw.

* * * * *